United States Patent [19]
Lewis

[11] 3,773,362
[45] Nov. 20, 1973

[54] PROPORTIONING VALVE WITH PRESSURE LIMITING

[75] Inventor: Richard L. Lewis, South Bend, Ind.

[73] Assignee: The Bendix Corporation, South Bend, Ind.

[22] Filed: Dec. 1, 1971

[21] Appl. No.: 203,712

[52] U.S. Cl. .................................. 303/6 C, 188/349
[51] Int. Cl. ............................................. B60t 13/00
[58] Field of Search ..................... 303/6 C; 188/349

[56] References Cited
UNITED STATES PATENTS
| | | | |
|---|---|---|---|
| 3,671,080 | 6/1972 | Kawaguchi | 303/6 C |
| 3,680,922 | 8/1972 | Kawai | 303/6 C |

*Primary Examiner*—Allen N. Knowles
*Attorney*—Ken C. Decker et al.

[57] ABSTRACT

A proportioning valve is installed in the rear brake line of the vehicle equipped with separate brake hydraulic systems for the front and rear brakes. The proportioning valve permits uninhibited fluid communication to the rear wheel brakes until a first pressure level is attained whereupon the valve restricts flow of fluid to the rear wheel brakes to establish a lower fluid pressure level in the latter than the fluid pressure level communicated to the front wheel brakes. An additional valve in the rear brake line is responsive to the pressure differential across the proportioning valve to terminate fluid communication to the rear wheel brakes when the pressure differential across the proportioning valve attains a predetermined amount. This feature enables the relationship between the braking pressure delivered to the rear wheel brakes and the braking pressure delivered to the front wheel brakes to approximate closely the ideal pressure relationship. In one embodiment of the invention, the point at which fluid communication to the rear wheel brakes is initially restricted by the proportioning valve varies as the rate of deceleration of the vehicle varies. In a second embodiment of the invention, the pressure level at which the proportioning valve initially restricts fluid pressure communication to the rear wheel brakes varies as the load carried by the rear axle of the vehicle varies.

8 Claims, 3 Drawing Figures

INVENTOR.
RICHARD L. LEWIS
BY
ATTORNEY 3,773,362

PROPORTIONING VALVE WITH PRESSURE LIMITING

BACKGROUND OF THE INVENTION

This invention relates to a pressure control valve device for use in a vehicle braking system.

The ideal relationship between the brake pressure delivered to the front wheel brakes of the vehicle to the braking pressure delivered to the rear wheel brakes of a vehicle has been known for many years and has been determined both experimentally and theoretically. As a result of these studies, it has become customary to employ pressure control devices, such as proportioning valves in the rear brake lines of a vehicle. Since the braking pressure required by the rear wheel brakes in proportion to the braking pressure required by the front wheel brakes varies as the load carried by the rear axle of the vehicle varies, it has become customary to employ a proportioning valve that is responsive to the load carried by the rear axle of the vehicle, particularly in commercial vehicles. As is evident to those skilled in the art, it is also possible to obtain the same effect as a load sensing proportioning valve by providing a valve which is responsive to the rate of deceleration of the vehicle, since the fluid pressure required to obtain a predetermined deceleration rate will vary as the load carried by the vehicle varies. However even these load sensing proportioning valves have not closely approximated the ideal pressure relationship between the front and rear brakes, because after the pressure level delivered to the front and rear brakes reaches a certain value, it is desirable not to increase further the pressure level delivered to the rear wheel brakes as the pressure level to the front wheel brakes is increased.

SUMMARY OF THE INVENTION

Therefore, an important object of my invention is to provide a pressure control device for use in a vehicle hydraulic braking system which establishes a pressure relationship between the front and rear wheel brakes which closely approximates the ideal pressure relationship between the latter.

Another important object of my invention is to provide a proportioning valve for use in the rear wheel brake lines which permits uninhibited fluid communication to the rear wheel brakes until a predetermined pressure level is attained, which then restricts fluid communication to establish a lower pressure level at the outlet of the valve which is communicated to the rear wheel brakes to the pressure level established at the inlet of the valve, and which terminates fluid communication to the rear wheel brakes when the pressure differential established across the valve attains a predetermined value.

Still another important object of my invention is to provide a valve which is responsive to the load carried by the vehicle and the rate of deceleration of the latter to vary the pressure level at which fluid communication is initially restricted to the rear wheel brakes accordingly, while maintaining substantially constant the predetermined pressure differential across the valve at which fluid communication to the rear wheel brakes is terminated.

DETAILED DESCRIPTION OF THE PREFERRED EMBODIMENT

Figure 1:
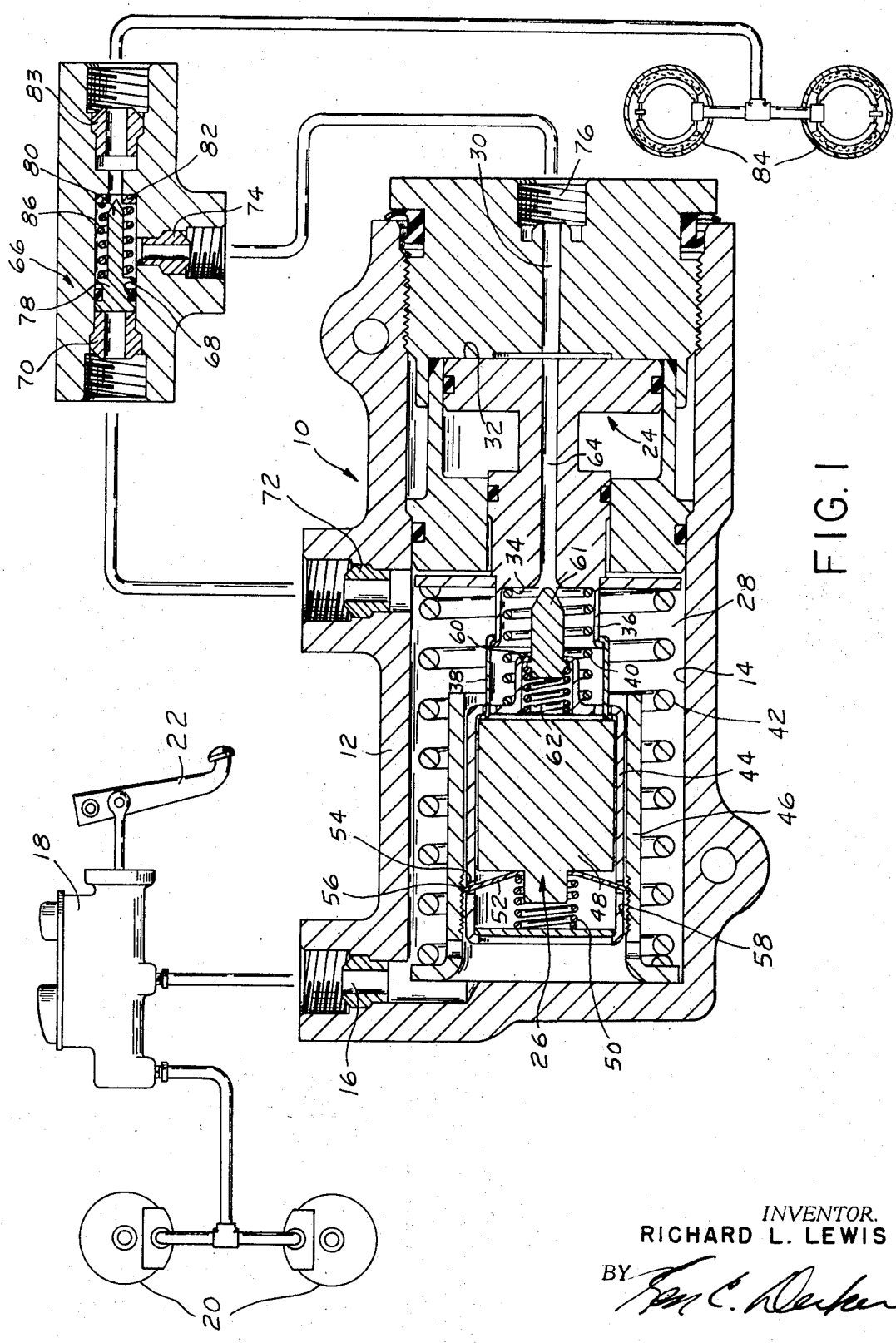
FIG. 1 is a schematic illustration of a vehicle hydraulic braking system with control valves made pursuant to the teachings of my present invention illustrated in cross section.

Referring now to the FIG. 1 of the drawings, a control valve generally indicated by numeral 10 includes a housing 12 defining a bore 14 therewithin having an inlet port 16. The inlet port 16 is communicated to one side of a standard automotive split system master cylinder generally indicated by the numeral 18, the other side of which is communicated to the front wheel disc brakes 20 of the vehicle. Fluid pressure is developed in the master cylinder 18 in the conventional manner by operation of a brake pedal 22 mounted in the vehicle operator's compartment.

First and second valve members 24 and 26 are slidably mounted in the bore 14 and divide the latter into an inlet chamber 28 and an outlet chamber 30. Valve member 24 is stepped to define a larger effective area 32 exposed to the fluid pressure level in the outlet chamber 30 and a small-er effective area 34 exposed to the fluid pressure level in the inlet chamber 28. Arm members 36 extend from end 34 of first valve member 24 and are provided with suitable detents that are adapted to engage corresponding detents on arms 38 which are carried by the second valve member 26. Engagement of the detents carried by the arm members 36 and 38 limits relative movement between the valve members 24 and 26 to a predetermined distance. A spring 40 is disposed between the members 44 and 26 and yieldably urges the detents on the arm members 36 into engagement with the corresponding detents on the arm members 38. Another spring 42 yieldably urges the end 32 of the valve member 24 into engagement with the right hand end of the housing 12, viewing FIG. 1.

Valve member 26 includes a housing 44 which is slidably received within a guide member 46 mounted in the bore 14. A relatively dense mass 48 is slidably received within the housing 44 and is urged toward the right hand end of housing 44 viewing FIG. 1 of the latter by a spring 50. A resilient washer 52 includes projecting arms which extend through openings 54 provided in the housing 44 and which terminate in tapered ends 56 which are adapted to be urged into locking engagement with one of serrations 58 provided on the guide member 46 upon movement of the mass to the left, viewing FIG. 1, against the force of the spring 50 during a vehicle deceleration. Second valve member 26 further includes a resilient poppet member 61 which is movable relative to the mass 48 but which is yieldably urged into engagement with a stop member 60 forming a portion of the housing 44 by a spring 62. The poppet member 61 is adapted to sealingly engage passage 64 extending through the first valve member 24 to control fluid communication through the latter between the inlet chamber 28 and the outlet chamber 30.

A second housing 66 defines a bore 68 therewithin having a first inlet port 70 which is communicated to the inlet chamber 28 by an inlet port 72 on the housing 12. Housing 66 is further provided with a second inlet port 74 which is communicated to an outlet port 76 which communicates to the outlet chamber 30. A differential pressure responsive plunger 78 is slidably mounted in the bore 68 and includes a projection 80 which is adapted to sealingly engage a valve seat 82 within the housing 66 to prevent fluid communication between the inlet port 74 and an outlet port 83 which is communicated to the rear wheel brakes 84 of the vehicle. However, a spring 86 yieldably urges the projection 80 away from the valve seat 82 to normally permit substantially uninhibited fluid communication between the inlet port 74 and the outlet port 83. However, when the pressure differential between the second inlet port 74 and the first inlet port 70 is of a sufficient magnitude to overcome the force of the spring 86, the projection 80 is urged into sealing engagement with the valve seat 82 to prevent further fluid communication to the rear wheel brakes 84.

MODE OF OPERATION OF THE PREFERRED EMBODIMENT

The various components of the control means are illustrated in FIG. 1 in the positions which they assume when the brakes of the vehicle are released. When the brakes of the vehicle are applied, fluid pressure is communicated into the inlet chamber 28 and immediately flows through the passage 64 to the outlet chamber 30, through the outlet port 76, into the bore 68, and out of the outlet port 83 to the rear wheel brakes of the vehicle. This mode of operation is represented by lines A–B in FIG. 3. Although the fluid pressure levels in the chambers 30 and 28 are identical, the fluid pressure level in the chamber 30 acts across a much larger area than does the fluid pressure level in the chamber 28. Therefore, a force acts upon the valve members 26 and 24 urging the latter to the left, viewing FIG. 1. Since the spring 40 is sufficiently strong to maintain detents on the arms 36 and 38 and in engagement with one another, movement of the valve member 24 also moves the second valve member 26. However, when the vehicle is declerated at a predetermined rate, the mass 48 accelerates to the left viewing FIG. 1, driving the tapered edges 56 of the resilient arms carried by the washer 52 into engagement with corresponding serrations 58 on the guide member 46 to lock the valve member 26 against further relative movement with the housing 12. When this occurs, the valve member 24 moves relative to the valve member 26 until the poppet 61 engages the passage 64 to terminate fluid communication therethrough. As the pressure level in the inlet chamber 28 is increased, the valve reopens; however, only a portion of the increase is transmitted to the outlet chamber 30 because of the differential areas between the ends 32 and 34 of the first valve means 24. Therefore, a proportioning action of the valve maintains a lower fluid pressure level in the chamber 30 than the fluid pressure level maintained in the chamber 28, as illustrated graphically by lines B–C in FIG. 3.

Figure 3:
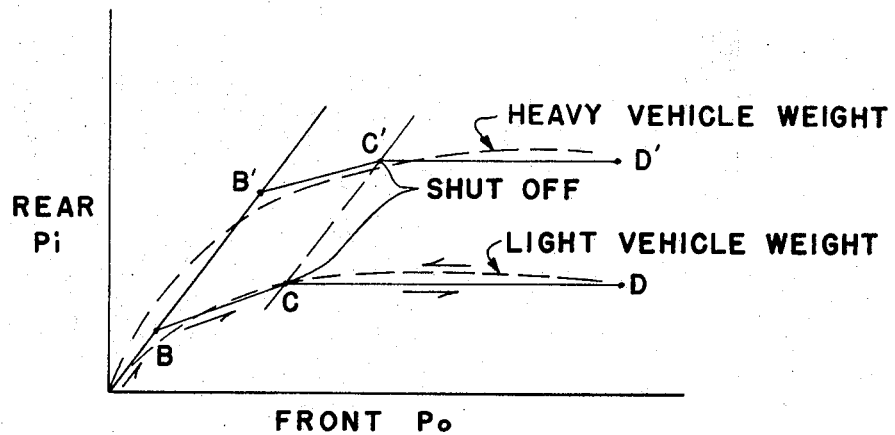
FIG. 3 is a diagrammatic illustration of the operation of the valves illustrated in FIGS. 1 and 2.

It will be apparent to those skilled in the art, that as the fluid pressure level in the inlet chamber 28 is increased, the pressure differential across the valve 10 between the inlet port 16 and the outlet port 76 will be increased. Since the pressure level in the inlet chamber 28 is transmitted to one side of the plunger 78 within the housing 66 and the pressure level in the outlet chamber 30 is transmitted to the other side of the plunger 78 in the housing 66, an increasing pressure differential will exist across the plunger 78 as the fluid pressure level in the inlet and outlet chambers is increased. Ultimately, this pressure differential will be sufficient to urge the projection 80 into sealing engagement with the valve seat 82 to prevent further fluid communication to the brakes 84. This state is represented by line C–D in FIG. 3. It will be noted that the actual operation of the valve, as illustrated by the solid line in FIG. 3, is quite close to the theoretically perfect brake pressure relationship between the front and rear brakes as illustrated by the dashed lines in FIG. 3. Of course, when the vehicle is heavily loaded, a much higher fluid pressure level is required to obtain a given vehicle deceleration. Therefore, a higher fluid pressure level is attained, in the chamber 28 before the mass 48 is accelerated a sufficient amount to lock the housing 44 against the guide member 46 to initiate a proportioning action of the valve members 24 and 26. This higher fluid pressure level is represented by point B' in FIG. 3, and the proportioning action of the valve members 24 and 26 at this higher pressure level is represented by line B' C' in FIG. 3. However, it will also be noted that since the force exerted by the spring 86 is constant, the same pressure differential between the chambers 30 and 28 will result in termination of fluid communication to the brakes 84 when the vehicle is heavily loaded as is required when the vehicle is lightly loaded. The pressure relationship between front and rear brakes after engagement of plunger 80 with seat 82 in a heavily loaded vehicle is represented by line C' D' in FIG. 3. Details of the construction and operation of the valve 10, especially its mode of operation when the brakes of the vehicle are released, are more completely described in copending U. S. Pat. application Ser. No. 171,929, filed Aug. 16, 1971, owned by the assignee of the present invention and incorporated herein by reference.

DETAILED DESCRIPTION OF THE ALTERNATE EMBODIMENT

Figure 2:
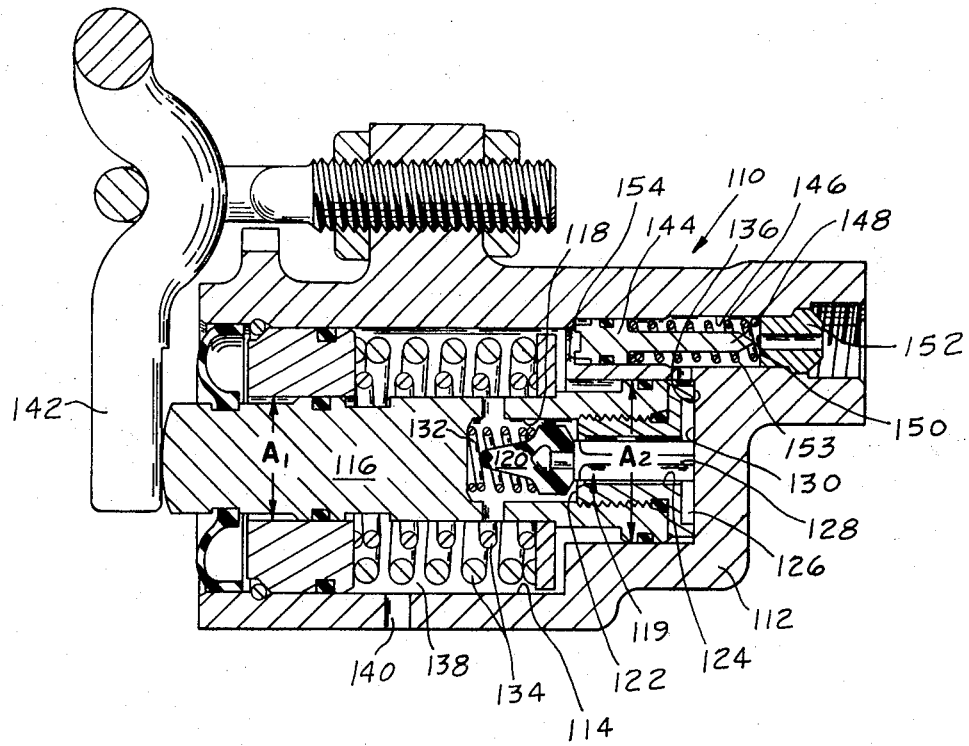
FIG. 2 is a cross-sectional view of an alternate embodiment of the control valves illustrated in FIG. 1.

Referring now to FIG. 2, a control valve 110 includes a housing 112 defining a first bore 114 therewithin which slidably receives a stepped piston 116. Piston 116 defines a compartment 118 therewithin in which a poppet member generally indicated by the numeral 119 recipricates. Poppet member 119 includes a resilient portion 120 which is adapted to cooperate with a valve seating area 122 in the compartment 118 to control fluid communication through a passage 124 communicating the compartment 118 to an outlet chamber 126. The resilient portion 120 is mounted on a fluted stem 128 which extends through the passage 124 to engage the end 130 of the housing 112. The end of the fluted stem 128 is yieldably maintained in engagement with the end 130 of the housing 112 by a spring 132. Additional spring means 134 yieldably urge the end 136 of the piston 116 into engagement with the end 130 of the bore 114. It will be noted that the fluted stem 128 is sufficiently long so that as long as the end 136 of the piston 116 is maintained in engagement with the end 130 of the bore 114, substantially uninhibited fluid communication is permitted between the compartment 118 and the outlet chamber 126 through the passage 124 around the flutes of the fluted stem 128. It will also be noted that the fluid pressure level in the compartment 118 is the same as the fluid pressure level communicated into the inlet chamber 138 through the inlet port 140. Therefore, the effective area of the piston 116 against which inlet fluid pressure acts is equal to the area identified by ($A_2-A_1$) while the fluid pressure level in the outlet chamber 126 acts across a substantially larger area identified by the letter $A_2$, disregarding the poppet area. One end of the piston 116 extends out of one end of the bore 114 and is engaged by a torsion bar 142. The torsion bar 142 reflects the relative position between the body and the rear axle of the vehicle on which the control valve 110 is mounted, and therefore exerts an additional force on the piston 116 supplementing the force of the springs 134 as the load carried by the rear axle of the vehicle is increased.

A differential pressure responsive plunger 144 is slidably mounted in a second bore 146 defined within the housing 112. The plunger 144 carries a projection 148 which is adapted to engage a valve seat 150 to prevent fluid communication out of the outlet port 152 which is communicated to the rear wheelbrakes of the vehicle. A spring 153 yieldably urges one end of the plunger into engagement with a flange 154 provided on the left hand end of the bore 146 viewing FIG. 2. As will be appreciated by those skilled in the art, fluid pressure in the inlet chamber 138 acts across one end of the plunger 144, while fluid pressure in the outlet chamber 126 acts across the other end of the plunger. When the pressure differential between the chambers 126 and 138 exceeds the force exerted by the spring 153, the projection 148 will be urged into sealing engagement with the valve seat 150 to terminate fluid communication out of the outlet port 152.

MODE OF OPERATION OF THE ALTERNATE EMBODIMENT

Various components of the valve 110 are illustrated in FIG. 2 in the positions which they assume when the brakes on the vehicle are released. When a brake application is effected, fluid is communicated into the compartment 118 and is communicated through the passage 124 into the outlet chamber 126 and then through the bore 146 to the outlet port 152. However, although equal fluid pressures act across areas ($A_2-A_1$) and $A_2$ on the valve piston 116, a force differential exists across the piston since area $A_2$ is larger than the area ($A_2-A_1$). When this force differential is sufficient to overcome the force exerted on the piston 116 by the springs 134 and by the torsion bar 142, the piston 116 moves to the left viewing FIG. 2 until the resilient poppet 120 seals against the valve seating area 122 to terminate fluid communication between the inlet chamber 138 and the outlet chamber 126. This state is represented by point B in FIG. 3. As the pressure level in inlet chamber is further increased, the valve reopens; however, only a portion of the increase in fluid pressure is transmitted to the outlet chamber 126 which is in proportion to the area ratio between the areas ($A_2-A_1$) and $A_2$. This state is represented by lines B–C in FIG. 3. When the fluid pressure level in the inlet and outlet chambers attain a value equivalent to that represented by point C in FIG. 3, the pressure differential acting across the plunger 144 is sufficient to overcome the force of the spring 153, and therefore, the projection 148 is driven into sealing engagement with the valve seat 150 to terminate further fluid communication through the outlet 152, as represented by line C–D in FIG. 3. If the load carried by the rear axle of the vehicle is increased, the torsion bar 142 exerts an additional force on the piston 116 urging the latter to the right viewing FIG. 2, and therefore the required pressure differential between the inlet and outlet chambers 138 and 126 is increased before proportioning action begins. Increased fluid pressure level at which proportioning action begins is illustrated by point B' in FIG. 3, and the proportioning action of the valve at this higher vehicle load is represented by point B' C' in FIG. 3. However, since the force exerted by the spring 153 is constant, the pressure differential between the chambers 138 and 126 required to urge the projection 148 against valve seat 150 is the same regardles of the vehicle load. The state at which fluid communication through the outlet port 152 is prevented in a heavily loaded vehicle is represented by line C' D' in FIG. 3. Again, it will be noted by those skilled in the art that the ideal pressure distributions between the front and rear brakes for both lightly and heavily loaded vehicles, as represented by the dashed lines in FIG. 3, are approximated quite closely by the operation of the valve means 110, as represented by the solid lines in FIG. 3.

When the brakes of the vehicle are released, the fluid pressure level in inlet chamber 138 and in the compartment 118 is reduced, causing the higher fluid pressure in the outlet chamber 126 to urge the valve piston 116 to the left viewing FIG. 2, thereby expanding the volume of the chamber 126 and reducing the fluid pressure level therein. When the fluid pressure level in the inlet chamber 138 is reduced an amount sufficient that the fluid pressure level in the outlet chamber 126 is sufficiently higher than the fluid pressure level in the inlet chamber 138, the poppet 119 is urged to the left viewing FIG. 2 relative to the piston 116 against the force of the spring 132. When this occurs, fluid communication is then again permitted directly between the outlet chamber 126 and the inlet chamber 138, until the brakes of the vehicle are fully released. At this time, the springs 134 and the force exerted on piston 116 by the torsion bar 142 returns the piston 116 so that the end 136 of the latter is again urged into engagement with the end 130 of the bore 114 as illustrated in FIG. 2.

I claim:
1. In a vehicle having front and rear wheel brakes:
first and second hydraulic systems communicated to said front and rear wheel brakes respectively;
fluid motor means for simultaneously generating braking pressure in said first and second hydraulic systems;
valve means in one of said hydraulic systems permitting unrestricted fluid communication through said one system until a first pressure level is attained in said system whereupon said valve means restricts communication through said one system to establish a lower pressure level at the corresponding wheel brakes than the fluid pressure level generated by said fluid motor means, said valve means including pressure differential responsive means terminating fluid communication to said corresponding wheel brakes when the pressure differential across said valve means attains a predetermined level; and
sensing means responsive to the rate of deceleration of the vehicle to vary said first pressure level as the rate of deceleration wanes.
2. In a vehicle having front and rear wheel brakes:
first and second hydraulic systems communicated to said front and rear wheel brakes respectively;
fluid motor means for simultaneously generating braking pressure in said first and second hydraulic systems;

valve means in one of said hydraulic systems permitting unrestricted fluid communication through said one system until a first pressure level is attained in said system whereupon said valve means restricts communication through said one system to establish a lower pressure level at the corresponding wheel brakes than the fluid pressure level generated by said fluid motor means, said valve means including pressure differential responsive means terminating fluid communication to said corresponding wheel brakes when the pressure differential across said valve means attains a predetermined level; and means responsive to the weight carried by the axle of the vehicle mounting said corresponding set of wheel brakes to increase said first pressure level as the load carried by the vehicle increases.

3. The invention of claim 2:
said one hydraulic system being communicated to the rear wheel brakes of the vehicle.

4. The invention of claim 2:
said valve means including housing means defining a first bore therein, valve members within said first bore dividing the latter into an inlet chamber communicated to said fluid motor means and an outlet chamber communicated to said corresponding wheel brakes, said pressure differential responsive means responding to the pressure differential between said inlet and outlet chambers.

5. The invention of claim 4:
said pressure differential responsive means including a plunger, valve mechanism responsive to movement of said plunger to terminate fluid communication between said outlet chamber and said corresponding wheel brakes, and means communicating the pressure level in said inlet chamber to one side of said plunger and the pressure level in said outlet chamber to the other side of said plunger.

6. The invention of claim 4:
said pressure differential responsive means including a second bore defined within said housing means, a plunger slidably mounted within said second bore and defining a pair of compartments between opposite ends of the plunger and corresponding ends of the second bore;

one of said compartments being communicated to said inlet chamber, the other compartment being communicated to said outlet chamber and to said corresponding wheel brakes; and second valve means in said second bore for terminating fluid communication between said other compartment and said corresponding wheel brakes upon sliding of said plunger when the pressure differential between said compartments attains a predetermined level.

7. The invention of claim 6; and
resilient means yieldably urging said plunger toward one end of said bore, whereby the pressure differential between said compartments must exceed the force exerted by said resilient means before said plunger slides.

8. The invention of claim 6:
said second valve means including a first valve member carried by said plunger and a second valve member mounted in said second compartment, said plunger sliding in said bore when a pressure differential of a predetermined magnitude is established across said plunger to urge said first valve member into sealing engagement with said second valve member to thereby prevent fluid communication to said corresponding wheel brakes.

* * * * *